US008805595B2

(12) United States Patent
Menke et al.

(10) Patent No.: US 8,805,595 B2
(45) Date of Patent: Aug. 12, 2014

(54) WIND TURBINE ARRANGED FOR INDEPENDENT OPERATION OF ITS COMPONENTS AND RELATED METHOD AND COMPUTER PROGRAM

(75) Inventors: Detlef Menke, Lotte (DE); Stefan Rieken, Lathen (DE)

(73) Assignee: General Electric Company, Schenectady, NY (US)

( * ) Notice: Subject to any disclaimer, the term of this patent is extended or adjusted under 35 U.S.C. 154(b) by 1031 days.

(21) Appl. No.: 12/015,899

(22) Filed: Jan. 17, 2008

(65) Prior Publication Data
US 2009/0187282 A1 Jul. 23, 2009

(51) Int. Cl.
G05D 3/12 (2006.01)
G05D 5/00 (2006.01)
G05D 9/00 (2006.01)
G05D 11/00 (2006.01)
G05D 17/00 (2006.01)
E03D 9/00 (2006.01)

(52) U.S. Cl.
USPC .............................. 700/287; 700/286; 290/44

(58) Field of Classification Search
USPC ..................................... 700/287, 286; 290/44
See application file for complete search history.

(56) References Cited

U.S. PATENT DOCUMENTS

| 4,634,110 | A | * | 1/1987 | Julich et al. .................. 714/11 |
| 5,053,964 | A | * | 10/1991 | Mister et al. ................. 701/19 |
| 5,083,039 | A | * | 1/1992 | Richardson et al. ........... 290/44 |
| 5,584,655 | A | * | 12/1996 | Deering ......................... 416/31 |
| 5,809,222 | A | * | 9/1998 | Kizu et al. ..................... 714/4.5 |
| 6,361,275 | B1 | | 3/2002 | Wobben |
| 6,661,111 | B1 | * | 12/2003 | Wobben ......................... 290/43 |
| 6,856,039 | B2 | | 2/2005 | Mikhail et al. |
| 7,003,309 | B2 | * | 2/2006 | Suzuki et al. ................. 455/502 |
| 7,042,110 | B2 | * | 5/2006 | Mikhail et al. ................. 290/44 |

(Continued)

FOREIGN PATENT DOCUMENTS

DE 10 2005 034899 A1 2/2007
EP 1666723 6/2006

(Continued)

OTHER PUBLICATIONS

Search Report and Written Opinion from corresponding EP Application No. 09150107.2-1267/ 2080900, dated Dec. 19, 2012.

*Primary Examiner* — Ramesh B. Patel
*Assistant Examiner* — Jason Lin
(74) *Attorney, Agent, or Firm* — Global Patent Operation; Douglas D. Zhang

(57) ABSTRACT

A wind turbine which is composed of several subunits is provided. Each of the several subunits includes a controller. Each of the controllers is adapted to operate in a cooperative mode and in an isolated mode. In the cooperative mode, one of the controllers operates as a master controller and the remaining controllers operate as slave controllers. In the isolated mode, each subunit is exclusively controlled by its respective controller, wherein each of the controllers acts as an independent master controller for its subunit. Further, a method for operating a wind turbine which includes at least two subunits is provided. Each of the at least two subunits includes at least one sensor, at least one actuator and a controller. The method for operating the wind turbine is carried out independently in each subunit and includes detecting at least one sensor signal; and determining and transferring a command to at least one actuator. Further, a segmented computer program for controlling a wind turbine which includes at least two subunits is provided.

20 Claims, 10 Drawing Sheets

(56) References Cited

U.S. PATENT DOCUMENTS

| | | | |
|---|---|---|---|
| 7,256,508 B2 | 8/2007 | Altemark et al. | |
| 7,285,870 B2 | 10/2007 | Schubert | |
| 7,717,673 B2* | 5/2010 | Menke | 416/1 |
| 2002/0029097 A1* | 3/2002 | Pionzio et al. | 700/286 |
| 2002/0089234 A1* | 7/2002 | Gilbreth et al. | 307/80 |
| 2004/0199295 A1* | 10/2004 | Fairlie et al. | 700/266 |
| 2004/0201220 A1* | 10/2004 | Andersen et al. | 290/44 |
| 2005/0012339 A1* | 1/2005 | Mikhail et al. | 290/44 |
| 2005/0090937 A1* | 4/2005 | Moore et al. | 700/286 |
| 2005/0230979 A1* | 10/2005 | Bywaters et al. | 290/44 |
| 2005/0285406 A1* | 12/2005 | Dawson et al. | 290/44 |
| 2006/0100748 A1* | 5/2006 | Schubert | 700/286 |
| 2007/0079611 A1* | 4/2007 | Doland | 60/495 |
| 2007/0205602 A1* | 9/2007 | Willey et al. | 290/44 |
| 2007/0267873 A1* | 11/2007 | Teichmann | 290/44 |
| 2008/0007121 A1* | 1/2008 | Erdman et al. | 307/47 |
| 2008/0051913 A1* | 2/2008 | Dold et al. | 700/3 |
| 2008/0069693 A1* | 3/2008 | Malakhova et al. | 416/61 |
| 2008/0093853 A1* | 4/2008 | Barker et al. | 290/44 |
| 2008/0106098 A1* | 5/2008 | Miller et al. | 290/44 |
| 2008/0118354 A1* | 5/2008 | Jeppesen et al. | 416/1 |
| 2008/0143110 A1* | 6/2008 | Guey et al. | 290/44 |
| 2008/0262787 A1* | 10/2008 | Malakhova et al. | 702/145 |
| 2008/0290664 A1 | 11/2008 | Kruger | |
| 2009/0008938 A1* | 1/2009 | Erdman et al. | 290/44 |
| 2009/0021015 A1* | 1/2009 | Pedersen | 290/44 |
| 2009/0102198 A1* | 4/2009 | Egedal | 290/44 |
| 2009/0160189 A1* | 6/2009 | Rasmussen | 290/44 |

FOREIGN PATENT DOCUMENTS

| | | |
|---|---|---|
| EP | 1 860 321 A2 | 11/2007 |
| JP | 60 045787 A | 3/1985 |
| WO | 2006069573 A1 | 7/2006 |

* cited by examiner

WIND TURBINE ARRANGED FOR INDEPENDENT OPERATION OF ITS COMPONENTS AND RELATED METHOD AND COMPUTER PROGRAM

BACKGROUND OF THE INVENTION

A method for operating components of a wind turbine independent from each other is disclosed herein. Further, a wind turbine which is adapted to be controlled by independent master controllers and a computer program for independent operation of wind turbine components is disclosed herein.

BRIEF DESCRIPTION OF THE INVENTION

A wind turbine which is composed of several subunits is provided. Each of the several subunits includes a controller. According to a first aspect each of the several controllers is adapted to operate in a cooperative mode and in an isolated mode; wherein, in the cooperative mode, one of the several controllers operates as a master controller and the remaining of the several controllers operate as slave controllers; and wherein, in the isolated mode, each subunit is exclusively controlled by its respective controller, each of said several controllers acting as an independent master controller for its subunit.

Further, a method for operating a wind turbine which includes at least two subunits is provided. Each of the at least two subunits includes at least one sensor, at least one actuator and a controller. In another aspect the method for operating a wind turbine is carried out independently in each subunit and includes detecting at least one sensor signal; and determining and transferring a command to at least one actuator.

Further, a segmented computer program for controlling a wind turbine which includes at least two subunits is provided. The segmented computer program includes at least two computer program parts for controlling respective subunits. When executed on a computer or controller the computer program parts enable detecting/detection of at least one sensor signal; and determination and transfer of a command to at least one actuator. In yet another aspect, the computer program parts are operable to control their respective subunit independently of each other.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation. For example, features illustrated or described as part of one embodiment can be used on or in conjunction with other embodiments to yield yet a further embodiment. It is intended that such modifications and variations are included herewith.

Figure 1:
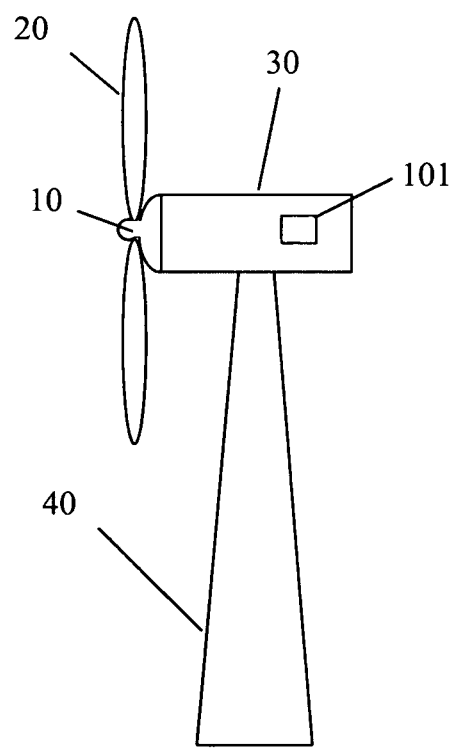
FIG. 1 shows a side view of a wind turbine in which aspects of the present technique are applicable.

FIG. 1 shows a schematic side view of a typical wind turbine 100. The wind turbine 100 includes a tower 40 to which a machine nacelle 30 is mounted at its top end. A hub 10 bearing one or more rotor blades 20 is mounted to a lateral end of the machine nacelle 30. The rotor blades 20 can be adjusted by pitch drives (not shown) which are typically accommodated inside the hub 10. In the context of this application, the term "wind turbine" refers to a machine that converts the kinetic energy of wind into mechanical energy. Typically the mechanical energy is converted into electrical energy using a synchronous or an asynchronous generator. In this event the nacelle 30 typically houses a yaw motor, a mechanical break (all not shown), a turbine controller 101 and a drive train to which a main electric generator is connected. Usually, the turbine controller 101 operates as a central control system which controls the wind power installation via special hardware components, such as for example a Single-Point-Status (SPS) controller and bus connections such as an Ethernet LAN, a Controller Area Network (CAN) bus or the like. The turbine controller 101 may include a programmable logic controller (PLC) or a computer operable to execute control algorithms. Typically, the turbine controller 101 operates as master controller which supervises the functions of the wind turbine 100. This may include controlling of other controllers of the wind turbine 100; communication with other wind turbines and/or a wind farm management system as well as error handling and operational optimization. Further, a SCADA (Supervisory, Control and Data Acquisition) program may be executed on the turbine controller 101. For example, time critical tasks may be handled by other controllers which are operated as slaves to the master controller 101. For example, blade regulation may be controlled by a controller of the hub 10 which operates as slave to master controller 101. In the context of this application, the terms "master" and "slave" should be understood as referring to a communication protocol or communication model where the master device or master process has unidirectional control over one or more slave devices or slave processes. It should be further understood, that the term "control" also includes a regulation-type of control, e.g. a feedback-loop regulation.

Figure 2:
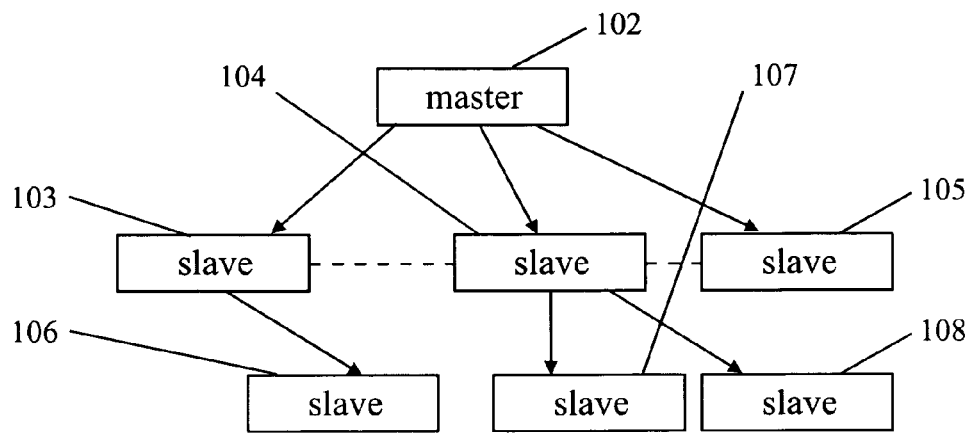
FIG. 2 shows a scheme of a control architecture with one master controller and several slave controllers as used in several embodiments described herein.

FIG. 2 illustrates a scheme of a control architecture of the wind turbine 100 with one master controller 102 and several slave controllers 103-108. The controllers 102-108 operate the wind turbine 100 in a cooperative mode. In the context of this application, the term "cooperative mode" should be understood as referring to a control architecture of the wind turbine 100 having one master controller which supervises at least one slave controller. According to FIG. 2, the master controller 102 of the wind turbine 100 has a direct, unidirectional control over three slave controllers 103-105 as indicated by the arrows. In an example the turbine controller 101 acts as the master controller 102 of the wind turbine 100 in the cooperative mode. Further, the two slave controllers 103 and 104 supervise the sub-controllers 106 and 107-108 respectively. I.e. the slave controllers 103 and 104 act as master with regard to the respective sub-controllers 106-108 but as slave with respect to the master controller 102 of the wind turbine 100. In the context of this application, the term "master controller" should be understood as referring to a controller which is not supervised from other controllers of the wind turbine 100. The term "master mode" should be understood as referring to an operation mode of a controller in which the controller acts as a master controller. Accordingly, the term "slave controller" should be understood a referring to a controller which controls a part of the wind turbine 100 but is supervised from another controller of the wind turbine 100. The term "slave mode" should be understood as referring to an operation mode of a controller in which the controller acts as slave controller. In other words, a master controller issues orders or commands to slave controllers but it does not act on orders or commands of other controllers of the wind turbine 100. A master controller may, however, receive and act on external orders or commands. For example, the master controller 102 of the wind turbine 100 may receive set points such as power to be produced from an external wind farm management system. Slave controllers act on orders or commands of a master controller. They may issue orders or commands to slave controllers which are on a lower hierarchy level of the command chain such as sub-controllers. In other words, a slave controller may operate as master of other slave controllers. But as long as a controller acts on commands or orders of other controllers, e.g. the master controller 102 of the wind turbine 100, it is considered to be a slave controller. The slave controllers of a hierarchy level may be in communication with each other as indicated by the dashed line in FIG. 2, e.g. for data exchange, but they do not control each other.

Figure 3:
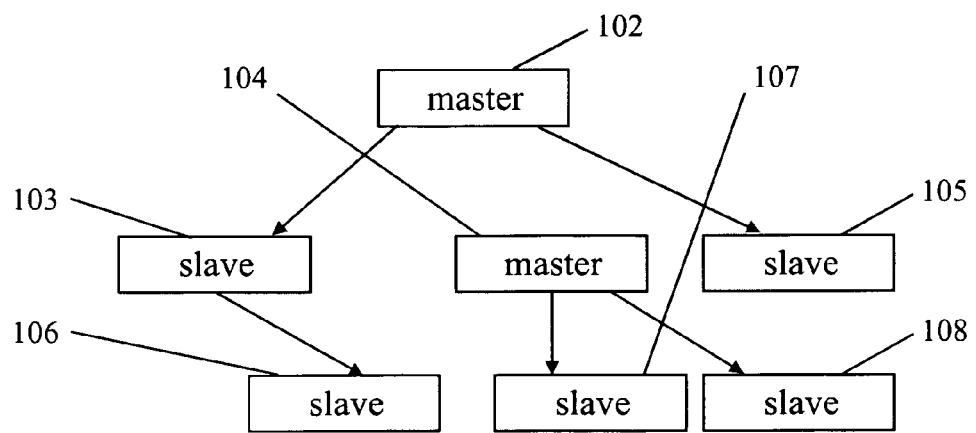
FIG. 3 shows a scheme of a control architecture with two master controllers and several slave controllers as used in several embodiments described herein.

FIG. 3 illustrates a scheme of a control architecture of the wind turbine 100 having the same controllers 102-108 as shown in FIG. 2 but operating in an isolated mode. In the context of this application, the term "isolated mode" should be understood as referring to control architecture of the wind turbine 100 having at least two independent master controller which control the wind turbine 100 without direct communication between each other. In FIG. 3 the two controllers 102 and 104 operate the wind turbine 100 as independent master controllers, i.e. they control the wind turbine 100 without direct, mutual information exchange. The master controller 102 directly communicates with and supervises the slave controllers 103 and 105 whereas the master controller 104 has a direct, unidirectional control over the sub-controllers 107 and 108.

Figure 4:
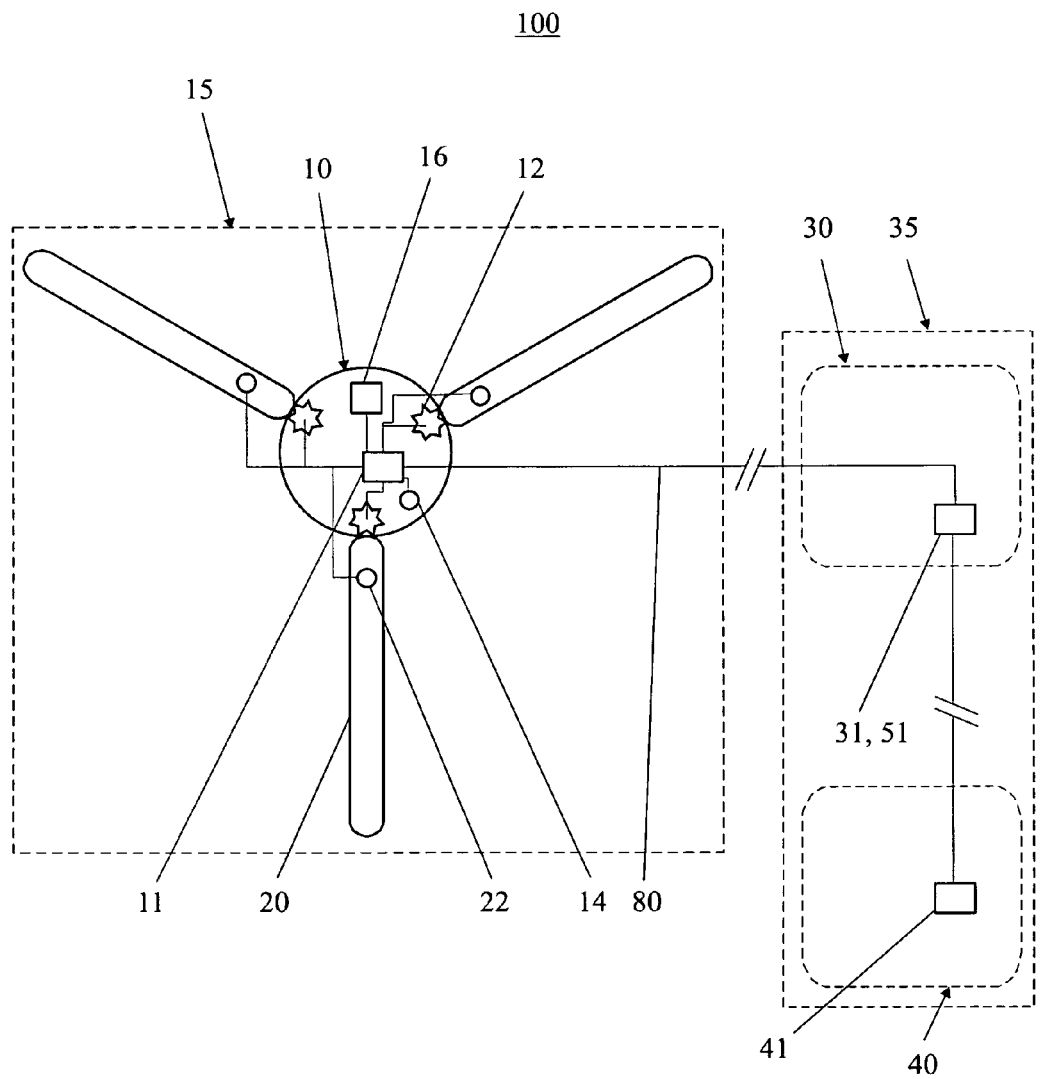
FIG. 4 shows a scheme of a hub subunit as used in several embodiments described herein.

Typically, the wind turbine 100 can be subunitized or segmented either according to its modular set-up and/or according to function, e.g. into a tower subunit 40, a nacelle subunit 30 and hub subunit 15 as indicated in FIG. 4. In the context of this application, the term "subunit" or component should be understood as referring to a part of a wind turbine 100 that is controlled by a controller. The classification of the parts of a wind turbine 100 depends on the control architecture. For example, instead of a tower subunit 40, which is controlled by a tower controller 41, and a nacelle subunit 30 controlled by a nacelle controller 31 a machine subunit 35 may be provided. Also, several subunits may be combined to form a larger subunit. For example, the tower subunit 40 and the nacelle subunit 35 may together form a machine subunit 30 which is controlled by a machine controller 51. The function of the machine controller 51 may be executed by the nacelle controller 31. However, as machine controller 51 it has additionally an unidirectional control over the tower controller 41. For supervising the tower controller 41 additional control routines are typically running on the nacelle controller 31. Further, each of the subunits may be divided into smaller sub-units, which may be referred to as sub-subunits, which are controlled by sub-controllers in slave mode. For example, the machine subunit may include the tower subunit 40, an azimutal drive subunit, a generator subunit (see also below) or the like. In this event, the machine controller 51 may further operate as master controller of the wind turbine 100 supervising the hub subunit 15 and the machine subunits by direct control of hardware and/or by supervising the sub-controllers or slave-controllers of the further included subunits. Under normal operation conditions, with functioning communication links 80 between the controllers, the controllers of the wind turbine 100 typically work in a cooperative mode, i.e. one of the controllers 11, 31 and 41 or 51 of the wind turbine 100 shown in FIG. 4 operates as a master controller of the wind turbine 100 and the remaining controllers are in a slave mode. For example, the nacelle controller 31 may operate as a master controller whereas the hub controller 11 and the tower controller 41 operate as slaves to the nacelle controller 31. According to one aspect, the controllers of the wind turbine 100 are also adapted to operate in an isolated mode, in which each subunit 15, 30 and 40 is exclusively controlled by its respective controller 11, 31 and 41 or 51. In the isolated operation mode, each of the controllers 11, 31 and 41 or 51 acts as an independent master controller for its respective subunit 15, 30 and 40 or 35. In the context of this application, the term "isolated mode" should be understood as referring to an operation mode of the controllers in which no direct communication between the respective controllers of different subunits is used as indicated by the broken communication lines 80 in FIG. 4. This may be due to unreliable or low or broken communication conditions between the respective controllers and includes both the event of no communication, e.g. due to a longer lasting hardware failure and/or software failure, and the event of unstable communication between the controllers. In both events the controllers, which have operated in a slave mode, switch to the master mode for independent controlling their respective subunit. The controller that has acted as master controller of the wind turbine 100 remains a master of its subunit but does no longer supervise the controllers of the subunits it is isolated from. Additionally and/or alternatively, a controller may switch to a master mode after receiving an unexpected command from its master controller or after receiving unexpected data from a sensor. In an event of a communication failure between the controllers or after receiving of unexpected data or commands by the controllers that is interpreted as an emergency event, the master controllers will typically ramp down the wind turbine 100 to zero power production in a controlled manner. In the context of this application, the term "ramp down" refers to decreasing the power output of the wind turbine 100. Thus an emergency shutdown which is typically accompanied by emergency breaking of the wind turbine 100 can be avoided. Emergency breaking is a high load for the wind turbine 100 that may limit its life time. Further, the wind turbine 100 may still produce power in the event of unreliable communication between the controllers as will be explained in more detail below. The wind turbine 100 may produce maximum power at given wind condition or may be ramped down to a lower power output, e.g. for safety reasons. Thus the downtime of the wind turbine 100 can be reduced. Depending on its operating status the wind turbine 100 may continue to produce power for some time prior to which it is ramped down to zero power production for safety reasons if the communication condition between the controllers remains unreliable or low or broken. Further, instead of a wired communication between the controllers, a less expensive wire-less communication such as a WLAN or any other radio network can be used. This is because the requirements on the communication network 80 with respect to real time ability, stability, response times etc. can be reduced. Less communication between the controllers is typically required and all time critical tasks can be handled independently by the controllers of the subunits. Alternatively, a communication network over power supply wiring, which also saves additional lines for the communication network, is used as communication network 80. A wire-less communication network 80 has, however, the additional advantage that in the event of a communication failure with only one or a few controllers the communications between the other controllers may not affected.

The hub subunit 15 is depicted in more detail in FIG. 4. The hub controller 11 is typically connected to pitch drives 12 and blade load sensors 22 of the rotor blades 20 and a speed and/or load sensor 14 of the not shown rotor axis the hub is connected to. The load sensors 22 may e.g. be realized as strain sensors. According to another aspect, the hub controller 11 controls the hub subunit 15 in the isolated mode on the basis of sensor data provided by the sensors 22 and/or 14 of the hub subunit 15 only. This enables the hub controller 11 to operate the hub 10 without communication with the other controllers 31 and 41 or 51. For example, the hub controller 11 reads the load of the rotor blades and the load and/or rotational speed of the rotor axis using the respective sensors 14 and 22. If there is an imbalance of load between the axis and the sum of loads acting on the rotor blades 20 and/or an increase or decrease of the rotational speed of the rotor axis at given load the controller 11 tries to balance this by changing the pitch angle of the rotor blades 20 using the pitch drives 12. In the event that the rotational speed of the axis decreases or increases slowly enough and/or if the load of the axis increases or decreases slowly enough, the hub controller 11 typically tries to accelerate and decelerate the hub 10 via regulation of the pitch of the rotor blades 20, respectively. If a steep increase or decrease in rotational speed of the rotor axis and/or a steep load drop or increase on the axis is detected, the controller 11 will typically force the rotor blades 20 to be drawn into a break position to decelerate the hub 10 and eventually stop rotation of the hub 10. Thereby, the hub controller 11 can, without exchanging data with the other subunits, in particular a subunit governing the generator, both operate the hub 10 to deliver maximal mechanical power to the generator and can drive the hub 10 in a save or break mode, wherein the wind turbine 100 is ramped down to zero power production. In this example, only information available within the hub subunit 15, in particular data obtainable within the hub subunits 15 are required for this. To produce the maximum power at given wind condition, suitable optimizing routines which are known by those skilled in the art will be carried out by the hub controller 11 at least if it is running as master of the hub subunit 15 in the isolated mode.

According to yet another aspect, the hub subunit 15 includes an independent or backup power supply 16 which ensures independent operation of the hub subunit 15 in the event of unstable or broken power supply. The backup power supply can include a battery, a magnetic energy storage, a flywheel device, fuel cells, pressure reservoirs, mechanical springs, capacitors or a combination thereof. Typically, the hub controller 11 issues a save slowing down of the hub 10, e.g. by requesting to turn the rotor blades 20 out of the wind via the pitch drives 12, if the energy stored in the power supply 16 is running short.

In still another aspect the hub subunit 15 includes a sensor for measuring the actual electrical condition of the internal grid (not shown) of the wind turbine 100. In the event of an outage or instability the power support of the hub subunit 15 it is switched to the backup power supply 16. Further, this sensor signal may be used to switch the hub controller 11 in a master mode. This is particularly useful if the power lines are also used as communication network 80 which may also be affected by the instability or outage of the internal grid.

With respect to FIG. 5 yet further aspects will be explained. Accordingly, the wind turbine 100 is arranged in the isolated mode to be controlled by only two independent masters, the hub controller 11 supervising the hub 10 and a machine controller 51 which is typically housed in the nacelle and supervises all remaining parts of the wind turbine 100, i.e. the machine subunit 35. The machine controller 51 is connected to a gear box 32, a break 33, a generator 34 and a sensor 71 for measuring the rotational speed and/or load of the rotor axis 70 and to a power converter 42 and connector or feeder 43 to an external grid 90. In the cooperative mode with fully operating network connection 80 to the hub controller 11, the machine controller 51 operates as master controller of the wind turbine 100, i.e. it supervises the hub controller 11 too. It is however also possible, that the hub controller 11 acts as master controller of the wind turbine 100 in the cooperative mode. In the isolated mode the machine controller 51 typically operates as independent master controlling exclusively all parts of the wind turbine 100 but the hub 10 which is exclusively controlled by the hub controller 11.

Further, the machine controller 51 typically receives data from a wind sensor 72. The sensor 72 may include a wind direction sensor such as a wind vane, a wind speed sensor such as an anemometer or an aerovane for measuring both wind direction and wind speed. These data can be used by the machine controller 51 to orientate the nacelle 30 in the wind using the azimutal drive system 37. In another example, the data of the wind sensor 72 are also used by the hub controller 11 e.g. to determine the optimal pitch angle. In other words, the two controllers 11 and 51 may both use the data of the wind sensor 72 in the isolated mode too. The machine controller 51 typically controls other supply units such as a cooling and heating system 36. As explained above for the hub subunit 15, the machine subunit 35 can include an independent or backup power supply 38.

Further, the machine controller 51 may have access to an electrical sensor 61 for determining voltages, currents and or the power flow on the ac line 60 from the generator 34 to the external grid 90. The measured date can be used to optimized the power output of the generator 34 (see also FIG. 6) and/or to initiate breaking of the generator 34 if the power flow is broken or disturbed e.g. due to a failure of the external grid 90. Such a breaking can safely be carried out if both the hub controller 11 and the machine controller 51 operate as independent masters in the isolated mode. A breaking of the rotor axis 70 by the machine controller 51 can independently be detected by the hub controller 11 by measuring the load on rotor axis 70 and/or speed of the rotor axis 70. As has been explained above the hub controller 11 can answer a steep change of those values by requesting the rotor blades 20 to be driven out of the wind or in a breaking position, respectively. Note, that a change which is in accordance with a change of the transmission ratio in the gear box 32. Such a change may be required during optimizing the power output at given wind condition and may be ignored by the hub controller 11. In other words, the hub controller 11 typically interprets a defined step-like change load of the rotor axis 70 and/or rotational speed of the rotor axis 70 as a change of the transmission ratio in the gear box 32. In such an event, the hub controller 11 typically continuous to optimize power transmission instead of scheduling a breaking. In this way the two independent master controllers 11 and 51 can operate the wind turbine 100 without communicating. Instead, only information available within the respective subunits 15 and 35 is used. This information is typically obtained within subunits 15 and 35 from measured data and possibly from the knowledge of the hardware of the other subunits, such as the available the transmission ratio and/or changes of the transmission ratio in the gear box 32.

Figure 6:
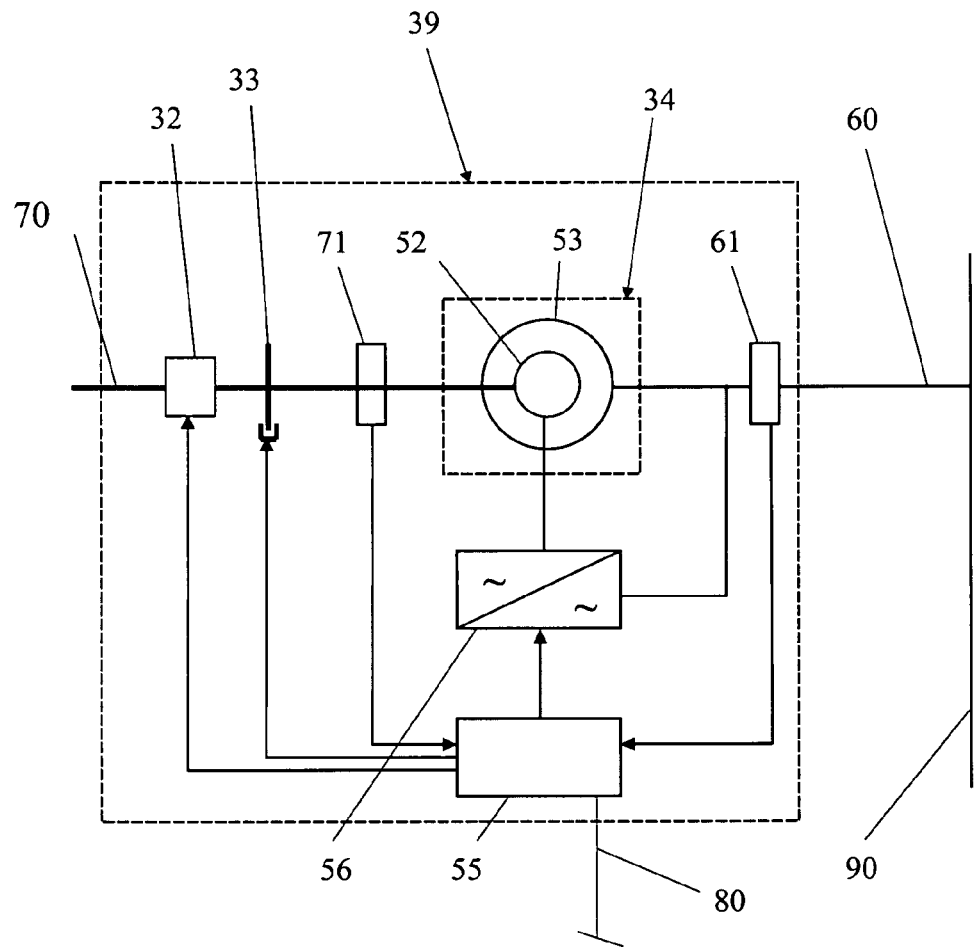
FIG. 6 shows a scheme of a generator subunit as used in several embodiments described herein.

According to still another aspect, the machine controller 51 supervises further sub-controller in slave mode such as a tower controller 41 or a generator controller which will explained with respect to FIG. 6.

Figure 5:
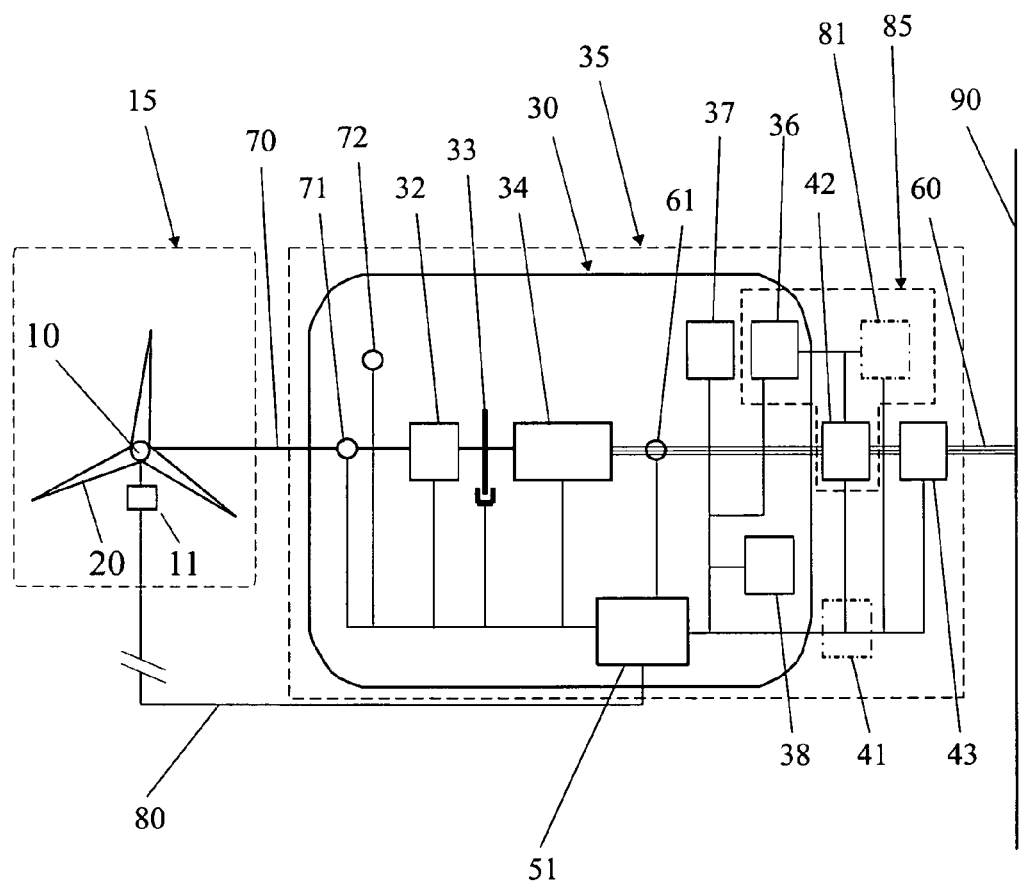
FIG. 5 shows a scheme of a machine subunit as used in several embodiments described herein.

In yet another aspect, the wind turbine 100 shown in FIG. 5 includes a converter subunit 85 which is controlled by a converter controller 81. In the event of a communication failure between machine controller 51 and the converter controller 81 the converter controller 81 may take over the independent control over the heating/cooling system 36 and the converter 42 of the subunit 85.

FIG. 6 illustrates the functional components of an exemplary generator subunit 39 of the wind turbine 100. A main component is the generator 34 which includes a generator stator 53 having windings (not shown) coupled to ac lines 60 and a generator rotor 52 having windings (not shown) coupled to a power converter 56, such as the shown variable frequency inverter. The power converter 56 is configured to control the torque produced by the generator 34 by adjusting the excitation voltage to the rotor windings. By controlling the frequency delivered to the generator rotor 52 it is also possible to keep the frequency of the power output of the generator on a stable level independently of the turning speed of the generator rotor 52. The excitation provided by the power converter 56 is based on a torque command and a frequency command transmitted by a generator controller 55. The generator controller 55 may include a programmable logic controller (PLC) or a computer operable to implement a torque control algorithm and a frequency control algorithm to ensure a fixed frequency output of required power at variable speed of the generator rotor 52. As known to those skilled in the art, power output of the generator is the product of generator speed and generator torque. The generator controller 55 typically checks the speed of the generator rotor 52 several times per second using a sensor 71. Accordingly, if speed is known the torque can be adjusted to optimize the power output of the generator 34. Further, the generator subunit 39 may be equipped with a sensor 61 for measuring the power output, voltage output, and/or current output of the generator 34. Note that the shown doubly fed induction generator 34 is chosen only for exemplification. The presented embodiments can be applied to any device that converts rotational motion into electrical power and is governed by a controller. In the cooperative mode the generator controller 55 may be the master controller of the wind turbine 100 supervising the other controllers such as a hub-controller 11 and a tower controller 41. Alternatively, the generator controller 55 is supervised by one of the other controllers. In the event of no or bad communication with at least one of the other controllers, in particular with the hub controller 11, the generator controller 55 acts in the isolated mode as independent master of the generator subunit 39. If only the communication with one of the controllers failed, the control relation between the still connected and communicating controllers may remain unchanged if one of the connected controllers has acted as master controller of the wind turbine 100 in the cooperative mode. In this event only two independent masters may operate the wind turbine 100 in the isolated mode. For example, in the event that only the connection between the hub controller 11 and the other controllers is malfunctioning the generator controller 55 may remain the master of the remaining subunits or take over the master control over the remaining subunits. In this event the control of the wind turbine 100 is organized as has already been explained with respect to FIG. 5. But also in the event of a multi-master control architecture of the isolated mode, the controlling of power production is similar to the event of two independent masters. This is because the power production and safety is mainly determined by the hub 10 and the generator 34 and the respective controllers. The azimutal drive can e.g. operate completely independent.

Figure 7:
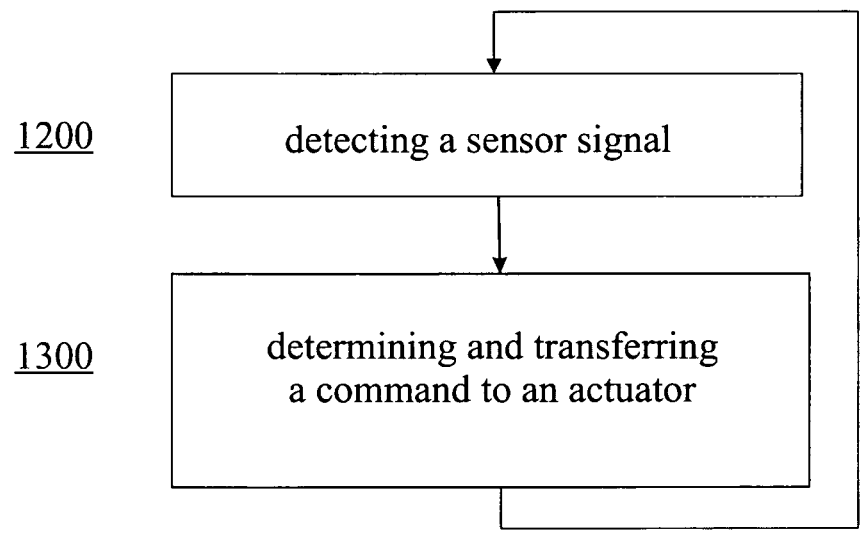
FIG. 7 shows a method for operating components of a wind turbine according to an embodiment described herein.

With respect to FIG. 7 a method 1000 for independent operation of components or subunits of the wind turbine 100 in the isolated mode is described. Accordingly, in a first step 1200 at least one sensor signal is detected and in a second step 1300 a command is determined and transferred to at least one actuator to control the subunit. In the context of this application, the term "actuator" should be understood in the broad sense of measuring and control technology as a device that converts one type of energy to another, i.e. an input signal or input variable into a different output signal or output variable, but does not act as a sensor. This includes devices which transform an input signal from a controller into motion such as a final control element like a pitch drive, a break, a valve or a connector as well as electric control devices or components like controllable power converters, controllable frequency converters or frequency inverters, a Peltier element, an electric power switch or the like. According to yet another aspect, the steps 1200 and 1300 are carried out independently in each subunit. In other words, the steps 1200 and 1300 are carried out by independent controllers, which operate in master mode, of the wind turbine 100. For example, the hub controller 11 may exclusively supervise the hub 10 whereas all the other functions of the wind turbine 100 are supervised by a machine controller 51 as explained with reference to FIG. 5. Typically, the steps 1200 and 1300 are in a close loop to operate the wind turbine 100 over a longer period without communicating controllers. Thus an emergency shut down of the wind turbine 100 and the above mentioned disadvantages associated therewith can be avoided. As has also been explained above the controllers typically use in the isolated mode only information that is available within the respective subunit. The information can be contained in a memory of the controller and/or obtained form sensors or sub-controllers within the respective subunit. Information stored in the memory may include details of the hardware of the other subunits. Typically, the information is processed such, that the wind turbine 100 produces the maximum power at given wind conditions or is ramped down to zero power production in an emergency event. Alternatively, the wind turbine 100 may be ramped down to a lower power output, e.g. for safety reasons.

Figure 8:
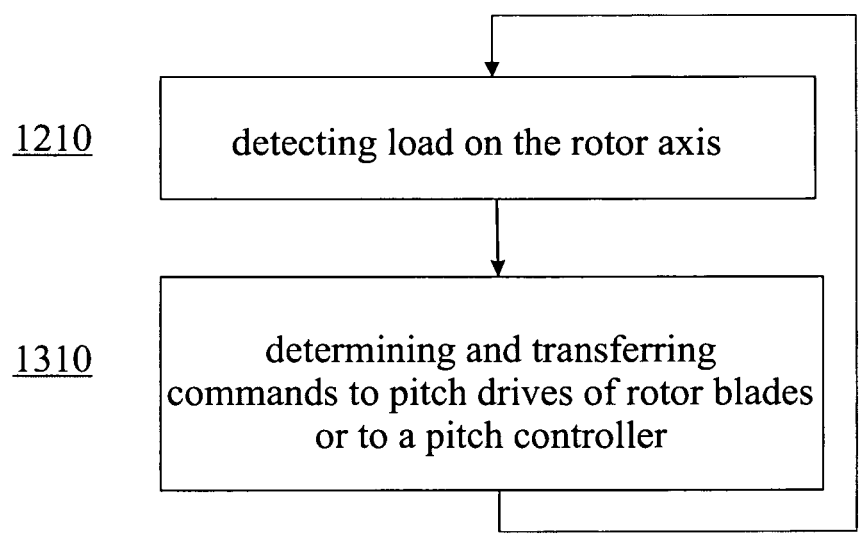
FIG. 8 shows a method for operating components of a wind turbine according to another embodiment described herein.

With respect to FIG. 8 a method 1010 for independent operation of subunits of a wind turbine 100 in the isolated mode is described. It comprises a step 1210 of detecting the load on the rotor axis 70 and a step 1310 of determining commands and issuing commands directly to the pitch drives 12 of the rotor blades 20 or to pitch controllers. This routine typically runs on the hub controller 11 in a close loop. In an alternative, another controller such as the nacelle controller 31 supervising the hub 10 runs the method 1010 in the isolated mode. Typically, the measured load on the rotor axis 70 is compared with the sum of the additionally measured loads on the rotor blades 20. If an imbalance between the two values is detected a regulating or control algorithm determines suitable commands, e.g. orientations of the rotor blades 20 to compensate the detected imbalance. Further, the step 1310 typically includes a comparison with earlier measurements of the load on the rotor axis 70 to detect a steep or step-like change. Such a change is typically compared with expected changes due to a possible change of the transmission ratio in the gear box 32. Typically, the rotor blades 20 are issued to turn into a break orientation for safety reasons only if the change of load on the rotor axis 70 lies outside the expected value ranges due to a changed transmission ratio in the gear box 32.

Figure 9:
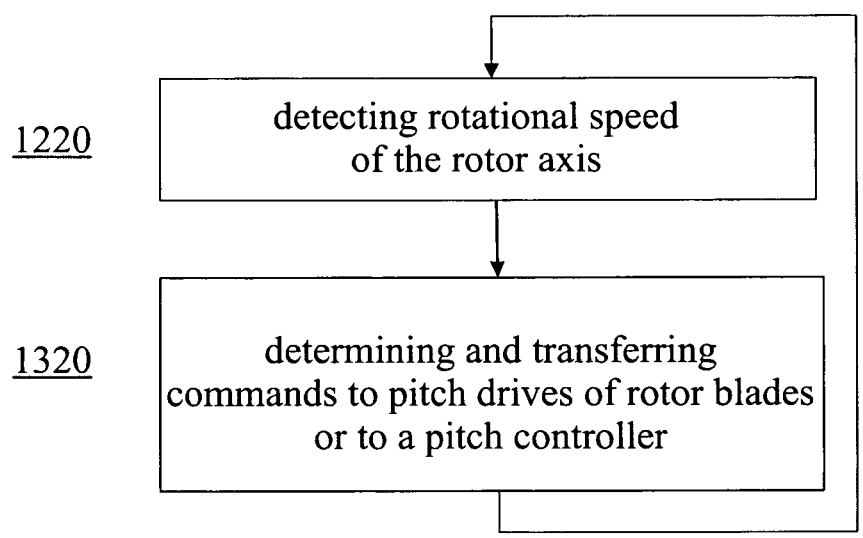
FIG. 9 shows a method for operating components of a wind turbine according to still another embodiment described herein.

The method 1020 which is described with respect to FIG. 9 is similar to the method 1010 of FIG. 8. It runs typically on the hub controller 11 or a controller which controls the hub 10 in the isolated mode too. However, in a first step 1220 the rotational speed of the rotor axis 70 is measured. In a subsequent step 1320 commands are determined and issued directly to the pitch drives 12 of the rotor blades 20 or to pitch controllers. Again, the steps 1220 and 1320 are typically carried out in a close loop. Further, the step 1320 may include a comparison with earlier measurements of the rotational speed of the rotor axis 70 to detect a change which is in accordance with expected changes due to a possible change of the transmission ratio in the gear box 32. Only if the change lies outside the expected ranges due to change in the transmission ratio the rotor blades 20 are typically issued to turn into a break orientation for safety reasons. Otherwise the controller typically continuous to maximize the power transmission.

In another example, the first step of a cycle of method for independent operation of the hub 10 includes both measuring the load of the rotor axis 70 and the speed of the rotor axis 70. Both values are in a subsequent step of each cycle used to determine the commands for the pitch drives 12 of the rotor blades 20 or a respective controller. This allows a more robust, i.e. more fault-tolerant control of the hub 10 in the isolated mode.

Figure 10:
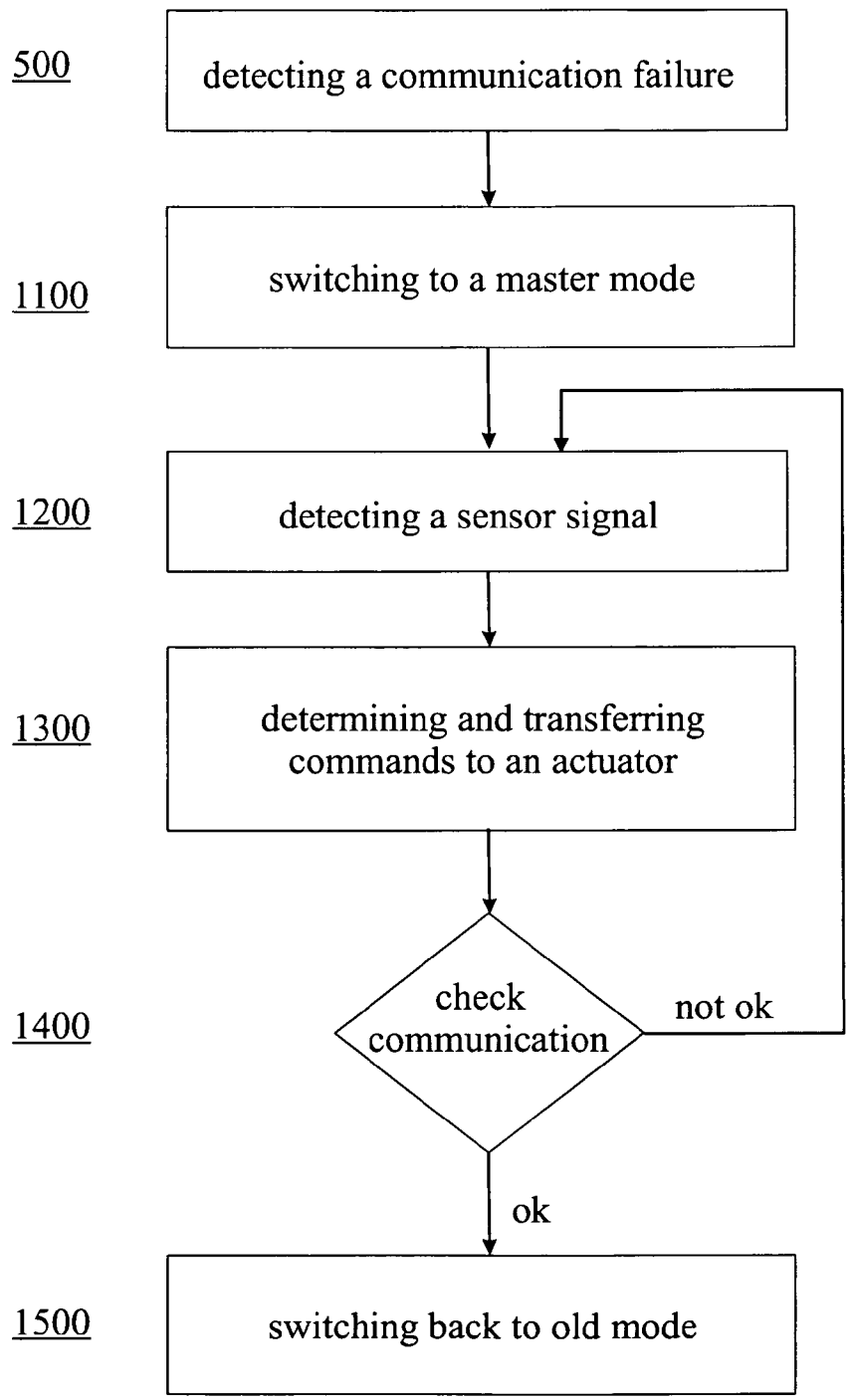
FIG. 10 shows a method for operating components of a wind turbine according to yet another embodiment described herein.

Typically the routines 1000, 1010 and 1020 for a controlling the hub 10 are part of a larger method or routine. This is illustrated in FIG. 10 showing a flow diagram of a method 1500 which is typically carried out in each subunit in parallel. If a critical communication failure is detected during the cooperative mode in a step 500, the respective controller switches in a step 1100 to a master mode in which it exclusively controls its respective subunit. If the controller has acted as master of the wind turbine 100 during the cooperative mode prior to and in step 500, it typically gives up the control over the controllers to which the communication is disturbed in step 1100. Otherwise the controller switches from a slave mode to a master mode in step 1100. This is followed by a closed loop control which includes the steps 1200 of detecting a sensor signal, the step 1300 determining and transferring commands to actuators and a step 1400 of checking the communication that has failed in step 500. Note, that those skilled in the art will be able to concretize the steps 1200 and 1300 for the respective subunits according to their tasks. If the communication still fails in step 1400 the method executes the next cycle beginning with the step 1200. Otherwise the controller switches back to its original control mode of step 500.

Figure 11:
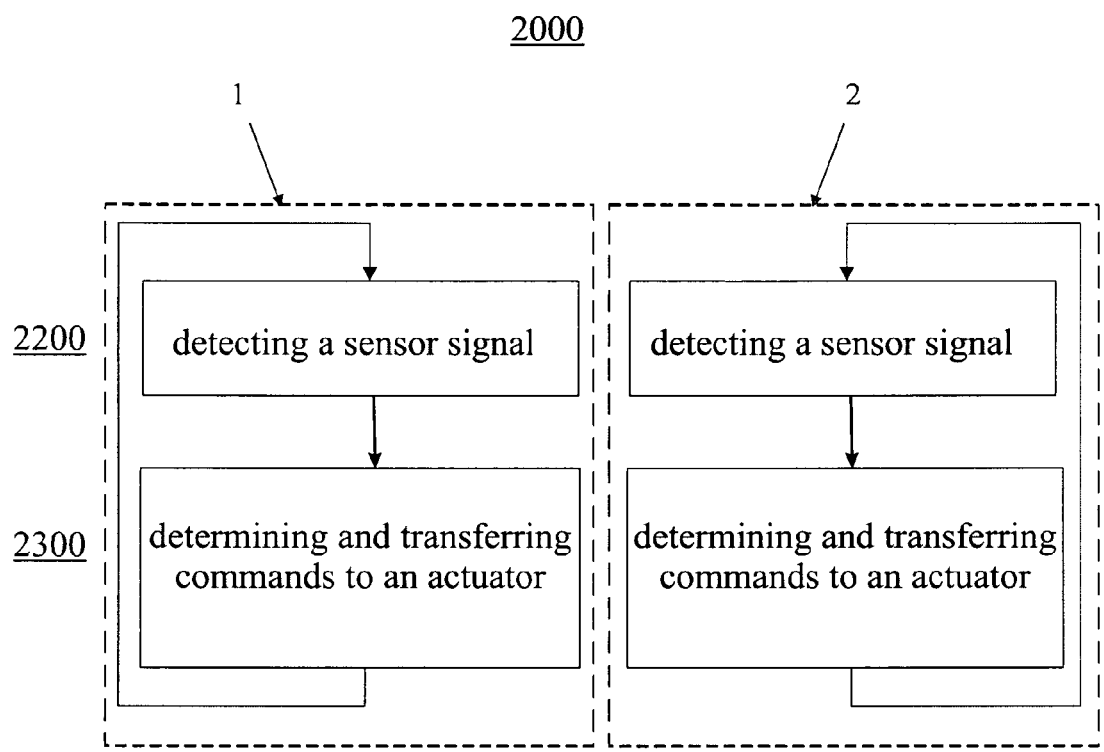
FIG. 11 shows a diagram of computer program modules and flow of information for controlling a wind turbine as used in several embodiments described herein.

With respect to FIG. 11 a segmented computer program 2000 for controlling the wind turbine 100 is explained. For exemplification, it includes two computer program parts 1 and 2 for controlling the respective subunits. Each computer program part is executed on a respective computer or controller and includes a step 2200 of detecting at least one sensor signal or several sensor signals and a step 2300 of determination and transfer of commands to at least one actuator such that the computer program parts 1 and 2 are operable to control their respective subunit independently of each other. Typically the steps 2200 and 2300 are carried out in a closed loop in larger program parts of each subunit which also includes appropriate program code for communicating with other controllers, for switching between master and slave modes and for operating the subunit in the slave mode. Typically, each program part has also access to information, stored in a respective accessible memory, about the hardware that is operated by the other program part. Further, this concept can be applied to any suitable number of controllers or subunits for completely operating a wind turbine 100 by operating independent parts of it.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine comprising:
several subunits, each of the subunits comprising a controller,
wherein each of said controllers is adapted to operate in a cooperative mode and in an isolated mode,
wherein, in the cooperative mode, one of said controllers operates as a master controller and the remaining of said controllers operate as slave controllers to the master controller,
wherein, in the isolated mode, each subunit is exclusively controlled by the respective controller and there is no direct communication among said controllers, each of said controllers acting as an independent master controller for the respective subunit, and
wherein each of the slave controllers is switchable from the cooperative mode to the isolated mode in response to an unexpected command from the master controller or unexpected data from a sensor of the wind turbine.

2. The wind turbine of claim 1, wherein each of the subunits comprises at least one sensor, each of the controllers being connected to the at least one sensor of the respective subunit, wherein, in said isolated mode, each of the controllers is operable to control the respective subunit exclusively on the basis of sensor data provided by said at least one sensor.

3. The wind turbine of claim 1, wherein at least one of the subunits further comprises at least one slave-controller which is adapted to be supervised by the controller of the subunit.

4. The wind turbine of claim 1, wherein at least one of the subunits further comprises a back-up power supply.

5. The wind turbine of claim 1, wherein at least one of the subunits further comprises a sensor for measuring an electrical condition of an internal grid of the wind turbine.

6. The wind turbine of claim 1, wherein one of said subunits is a hub subunit.

7. The wind turbine of claim 6, wherein said hub subunit comprises a sensor for measuring at least one of a load on a rotor axis and a rotational speed of the rotor axis.

8. The wind turbine of claim 1, wherein one of said subunits is a generator subunit.

9. The wind turbine of claim 1, wherein one of said subunits is a tower subunit, a machine subunit or a converter subunit.

10. The wind turbine of claim 2, wherein one of the subunits is a hub subunit which is controlled exclusively by the respective controller functioning as a master controller in the isolated mode.

11. A method for operating a wind turbine comprising at least two subunits, each of the at least two subunits comprising at least one sensor, at least one actuator and a controller, comprising:
    detecting at least one sensor signal;
    determining and transferring a command to the at least one actuator;
    operating the wind turbine in a cooperative mode comprising operating one of the controllers as a master controller controlling the operation of the wind turbine and operating each of the remaining of the controllers as a slave controller to the master controller;
    operating each of the controllers independently during operation of the wind turbine in an isolated mode, wherein in the isolated mode, the detecting and the determining and transferring are carried out independently in each subunit and there is no direct communication among the controllers; and
    during operating of the wind turbine in the cooperative mode, after receiving an unexpected command from the master controller or an unexpected signal from a sensor of the wind turbine, causing each slave controller to switch to a master mode and operate in the isolated mode.

12. The method of claim 11, wherein the controllers use only information available within the respective subunits to control the subunits.

13. The method of claim 12, wherein the controllers receive information only from sensors or slave-controllers of the respective subunits.

14. The method of claim 12, wherein the controllers communicate only with sensors, actuators and slave-controllers of the respective subunits.

15. The method of claim 11, wherein at least one subunit further comprises at least one slave-controller which is supervised by the controller of the at least one subunit.

16. The method of claim 11, wherein the detecting and the determining and transferring are carried out such that the wind turbine produces a predetermined maximum power at a given wind condition.

17. The method of claim 11, wherein the detecting, the determining and transferring are carried out such that the wind turbine is ramped down.

18. The method of claim 11, wherein the at least two subunits comprises a hub subunit which is controlled by an independent master.

19. The method of claim 18, wherein the hub subunit is accelerated and decelerated after detecting a decreasing and increasing of rotation speed of a rotor axis, respectively.

20. A non-transitory computer readable medium encoded with a segmented computer program for controlling a wind turbine comprising at least two subunits, the segmented computer program comprising at least two computer program parts for controlling the respective subunits, the at least two computer program parts enabling
    detecting of sensor signals;
    determination and transfer of commands to actuators;
    operation of the wind turbine in a cooperative mode wherein one of the at least two computer program parts operates as a master controller controlling the operation of the wind turbine and each of the remaining of the at least two computer program parts operates as a slave controller to the master controller;
    operation of the wind turbine in an isolated mode wherein the at least two computer program parts are operable to control the respective subunits independently of each other and there is no direct communication among the at least two computer program parts; and
    during operation of the wind turbine in the cooperative mode, after receiving an unexpected command from the master controller or an unexpected signal from a sensor of the wind turbine, causing each slave controller to switch to a master mode and operate in the isolated mode.

* * * * *